US008782632B1

(12) United States Patent
Chigurapati et al.

(10) Patent No.: US 8,782,632 B1
(45) Date of Patent: Jul. 15, 2014

(54) METHODS AND APPARATUS FOR PERFORMING IN-SERVICE SOFTWARE UPGRADE FOR A NETWORK DEVICE USING SYSTEM VIRTUALIZATION

(75) Inventors: Chakravarthi S. Chigurapati, Palo Alto, CA (US); Pawan Uberoy, San Jose, CA (US); Somnath Mani, Santa Clara, CA (US); Praveen Madhav, San Jose, CA (US); Duncan Stuart Ritchie, Bowen Island (CA); Sebastian Sapa, Vancouver (CA)

(73) Assignee: Tellabs Operations, Inc., Naperville, IL (US)

( * ) Notice: Subject to any disclaimer, the term of this patent is extended or adjusted under 35 U.S.C. 154(b) by 207 days.

(21) Appl. No.: 13/526,038

(22) Filed: Jun. 18, 2012
(Under 37 CFR 1.47)

(51) Int. Cl.
*G06F 9/44* (2006.01)
(52) U.S. Cl.
USPC .......................... 717/172; 717/168; 717/170
(58) Field of Classification Search
None
See application file for complete search history.

(56) References Cited

U.S. PATENT DOCUMENTS

| 7,406,038 | B1* | 7/2008 | Oelke et al. | 709/225 |
|---|---|---|---|---|
| 7,412,701 | B1* | 8/2008 | Mitra | 717/174 |
| 7,657,887 | B2* | 2/2010 | Kothandaraman et al. | 717/170 |
| 8,205,194 | B2* | 6/2012 | Fries et al. | 717/172 |
| 8,286,238 | B2* | 10/2012 | Durham et al. | 717/170 |
| 8,402,453 | B2* | 3/2013 | Gupta et al. | 717/172 |
| 8,402,454 | B2* | 3/2013 | Wang et al. | 717/172 |
| 8,423,639 | B2* | 4/2013 | Pope et al. | 709/224 |
| 8,505,003 | B2* | 8/2013 | Bowen | 717/168 |
| 2009/0089774 | A1* | 4/2009 | Lynch et al. | 717/173 |
| 2009/0100420 | A1* | 4/2009 | Sapuntzakis et al. | 717/168 |
| 2009/0217244 | A1* | 8/2009 | Bozak et al. | 717/168 |
| 2010/0042712 | A1* | 2/2010 | Lindem et al. | 709/223 |
| 2010/0042869 | A1* | 2/2010 | Szabo et al. | 717/171 |
| 2010/0287544 | A1* | 11/2010 | Bradfield et al. | 717/172 |
| 2011/0087774 | A1* | 4/2011 | Pope et al. | 709/224 |
| 2011/0126197 | A1* | 5/2011 | Larsen et al. | 717/176 |
| 2011/0225574 | A1* | 9/2011 | Khalidi et al. | 717/168 |
| 2011/0265076 | A1* | 10/2011 | Thorat et al. | 717/172 |
| 2011/0271270 | A1* | 11/2011 | Bowen | 717/171 |

(Continued)

OTHER PUBLICATIONS

Colin McNamara, Cisco is using Linux virtualization and 40 core CPU's for its next generation routers, [Online] Mar. 10, 2009, [Retrieved from the Internet on Mar. 5, 2014] <http://www.colinmcnamara.com/cisco-is-using-linux-virtualization-and-40-core-cpus-for-its-next-generation-routers/>.*

(Continued)

*Primary Examiner* — Thuy Dao
*Assistant Examiner* — Ravi K Sinha
(74) *Attorney, Agent, or Firm* — James M. Wu; JW Law Group (57) ABSTRACT

A method and/or network system is able to perform an in-service software upgrade ("ISSU") using virtualization technology while ongoing network service is maintained. After receipt of an upgrade signal such as a command of software upgrade, a new or second virtual machine ("VM") is created in response to the upgrade signal. After downloading the new version of program to the second VM while maintaining the first version of program running on the first VM, the process for providing network management begins to migrate from the first version of program to the new version of program. The process simultaneously facilitates ISSU for a data-path module such as a line card to convert from the previous version of software to the new version of the software.

6 Claims, 8 Drawing Sheets

(56) References Cited

U.S. PATENT DOCUMENTS

| | | | |
|---|---|---|---|
| 2012/0054736 A1* | 3/2012 | Arcese et al. | 717/172 |
| 2012/0072893 A1* | 3/2012 | Gupta et al. | 717/168 |
| 2012/0072894 A1* | 3/2012 | Wang et al. | 717/168 |
| 2012/0102480 A1* | 4/2012 | Hopmann et al. | 717/172 |
| 2012/0266156 A1* | 10/2012 | Spivak et al. | 717/172 |
| 2013/0036328 A1* | 2/2013 | Mutisya et al. | 717/172 |

OTHER PUBLICATIONS

Philip Hunter, Changing Platforms, [Online] 2008, Engineering & Technology 3, No. 8, [Retrieved from the Internet] <http://ieeexplore.ieee.org/stamp/stamp.jsp?tp=&arnumber=4621926> pp. 54-57.*

Antti Kankkunen, Non-service affecting software upgrades for multi-service routers, [Online] Oct. 2005, Design of Reliable Communication Networks, 2005. Proceedings.5th International Workshop on, [Retrieved from the Internet] <http://ieeexplore.ieee.org/stamp/stamp.jsp?tp=&arnumber=1563881&isnumber=33187> pp. 295-300.*

Debashis Basak, Rohit Toshniwal, Serge Maskalik, and Allwyn Sequeira, Virtualizing networking and security in the cloud, [Onine] Dec. 2010, SIGOPS Oper. Syst. Rev. 44, 4 (Dec. 2010), [Retrieved from the Internet] <http://delivery.acm.org/10.1145/1900000/1899939/p86-basak.pdf> pp. 86-94.*

Mark Reitblatt, Nate Foster, Jennifer Rexford, Cole Schlesinger, and David Walker, Abstractions for network update, [Online] 2012, SIGCOMM Comput. Commun. Rev. 42, 4 (Aug. 2012), [Retrieved from the Internet] <http://delivery.acm.org/10.1145/2380000/2377748/p323-reitblattpdf> pp. 323-334.*

* cited by examiner

METHODS AND APPARATUS FOR PERFORMING IN-SERVICE SOFTWARE UPGRADE FOR A NETWORK DEVICE USING SYSTEM VIRTUALIZATION

FIELD

The exemplary embodiment(s) of the present invention relates to communications network. More specifically, the exemplary embodiment(s) of the present invention relates to in-service software upgrade or downgrade to networking devices.

BACKGROUND

With rapid growth of information and/or data transfer over a high-speed communication network such as 3G or 4G cellular services, managing and controlling such data transfer become increasingly difficult and complicated. To handle large amount of network traffic, a conventional network layout employs one or more communications networks such as Internet, LAN (local area network), and/or wireless networks having various network devices such as access switches, routers, and bridges to facilitate data delivery from source to destination.

A large number of network communication devices, such as switches and routers, typically contain one or more processors, microprocessors, central processing units ("CPUs"), network processors ("NPs"), processing engines ("PEs"), and the like. A function of a processor is to execute instruction based on its hardware design as well as loaded or installed software. Although hardware such as circuits and circuitry connections typically cannot be altered substantially once it is fabricated, software with new functions and/or fixes can typically be reinstalled as frequently as needed. For example, newly released software may be reloaded or reinstalled to an existing processor or CPU.

A drawback, however, associated with conventional software upgrade or modification on a network device is that it typically requires the device to stop operation and then upgrade its software. After upgrading or reinstalling new software, system or device rebooting is generally required. During system reinstallation and/or reboot, the device typically cannot provide network service whereby rendering network outage. Such network outage relating to a network system or device can negatively affect overall network performance.

A conventional approach to mitigate service interruption during software upgrade is to provide hardware redundancy, fast reboot, or rolling upgrade. A problem associated with hardware redundancy is that it increases in hardware complexity and added resources to implement the redundancy which means additional cost per port. Fast reboot/boot still causes outage of network service even though the outage duration is reduced. Furthermore, the problem associated with rolling upgrade is that different devices run on different versions of software because of discrepancy of upgrading time.

SUMMARY

One embodiment of the present invention discloses an implementation of in-service software upgrade ("ISSU") using virtualization technology while ongoing network service is maintained. After receipt of an upgrade signal such as a command of software upgrade, a new or second virtual machine ("VM") on a control card, in one embodiment, is created in response to the upgrade signal. In one aspect, the second VM is created on all cards including LCs as well as control card(s). After downloading the new or second version of program at the second VM while maintaining the first version of program running on the first VM, the process for providing network management begins to migrate from the first (or current) version of program to the second (or new) version of program. The process simultaneously facilitates ISSU for a data-path module such as a line card to convert from the previous version of software to the new version of the software.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention is described herein in the context of a method, device, and/or apparatus able to provide in-service software upgrade/degrade ("ISSU") to a network device such as a router using virtualization technology whereby performance degradation is minimized.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

Information pertaining to the transfer of packet(s) through a network is embedded within the packet itself. Each packet traveling through one or more communications networks such as Internet and/or Ethernet can be handled independently from other packets in a packet stream or traffic. For example, each router, which may include routing, switching, and/or bridging engines, processes incoming packets and determines where the packet(s) should be forwarded.

A network system such as a router or a cluster of routers, in one embodiment, is able to perform ISSU using virtualization technology while continuing providing network services using current version of software. After receipt of an upgrade signal such as a command of software upgrade, a new or second virtual machine ("VM") on a control card is generated. After downloading new or second version of program in the second VM while maintaining the first version of program running on the first VM, the process for providing network management begins to migrate from the first version of program to the second version of program. In one aspect, the process subsequently facilitates ISSU performance for a datapath module such as a line card ("LC") to convert from the previous version of software to the new version of the software. It should be noted that software upgrade may also include software modification as well as software downgrade.

One embodiment of the present invention further discloses a technique of performing ISSU to a program or application internal state using type, length, and offset ("TLO") metadata. For example, after generating a second VM ("2VM") running on a network device in response to a program modification signal, a second database having a second data structure is built in the second VM in accordance with requirements relating to the new version of software. While second database is being generated, the first database having a first data structure running on the first VM based on current version of software continues to provide necessary information to support normal network operation. The process subsequently switches from accessing the first database to the second database when a switchover command is received from the ISSU manager and/or ISSU proxy.

Figure 1:
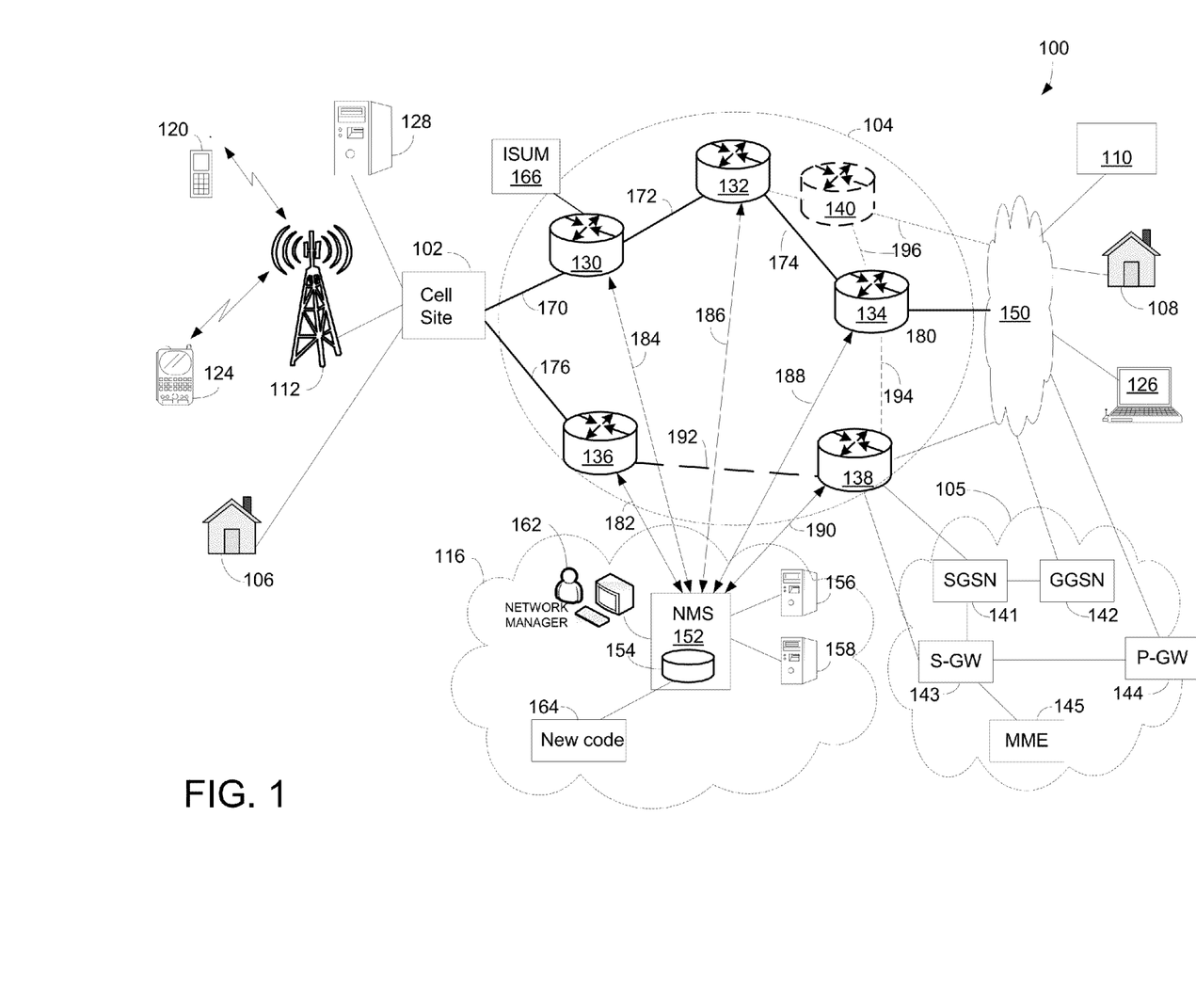
FIG. 1 is a block diagram illustrating a network configuration having multiple network nodes capable of minimizing network performance degradation during software upgrade in accordance with one embodiment of the present invention.

FIG. 1 is a block diagram illustrating a network configuration having multiple network devices capable of minimizing network performance degradation during software upgrade in accordance with one embodiment of the present invention. Diagram 100 includes a cell site 102, a switching network 104, a central office ("CO") 116, and Internet 150. Internet 150 is further coupled with a user 108, a content provider 110 such as a website, and a wireless computer 126. CO 116 provides various network managements including software updates to various network devices. In one embodiment, CO 116 and communication devices in network 104 employ in-service software upgrade/degrade manager ("ISUM") 166. ISUM 166 which can reside elsewhere in the network is able to minimize service degradation, hits, or interrupts during software upgrade using virtualization technology. It should be noted that the underlying concept of the exemplary embodiment(s) of the present invention would not change if one or more blocks (or devices) were added to or removed from diagram 100.

Cell site 102 is used to communicate with mobile devices such as cellular phone 120 and handheld device 124 via radio tower 112. It should be noted that cell site 102 may include additional radio towers as well as other land based switching circuitry. Cell site 102, which is also known as base station and/or cell station, can be configured to support wireless communications as well as wired communications. For example, network communication between users such as nodes 106-108 is managed and facilitated via CO 116, switching network 104, Internet 150, and cell site 102.

Switching network 104 receives and/or routes information, such as packet streams and packet flows between users and/or providers connected to the network. Network 104 includes communication devices or network elements ("NEs") 130-140 which are also known as nodes, switches, bridges, and/or routers. A node, as a logical network entity, is able to manage one or more physical network devices. The physical network devices include routers, modems, hubs, bridges, servers, switches, et cetera. NEs 130-140 are interconnected via connections 170-176 and are used for routing information and/or data packets to and from network clients and/or hosts. Network client in one example may include one or more routers, switches, hosts, users, base stations, and the like. For example, switching network 104 uses NEs 130-134 to route a packet stream from users 106 to 108 via cell site 102 and Internet 150.

NEs 130-140, in one aspect, can be routers, switches, bridges, or a combination of routers, switches, and bridges. The total number of NEs used in switching network 104 may increase or decrease over time depending on the demand of network services. For example, with increasing demand of video streaming, the number of NEs as illustrated in diagram 100 can grow to meet such demand. One aspect of network growth is to add additional NEs into an existing pool of NEs to expand processing and/or service capacity. For instance, NE 140 is recently added to the pool of NEs 130-136 for enhancing routing or processing capacities. The number of NEs can grow into hundreds or thousands depending on the network service demand. Dotted lines 192-196 illustrate connecting lines that recently added or will be added.

Referring back to FIG. 1, diagram 100 further includes an evolved packet core ("EPC") network 105 including various network nodes, such as SGSN 141, GGSN 142, S-GW 143, P-GW 144, and MME 145. EPC network 105 can be implemented in network 104 or a portion of EPC network 105 is implemented in network 104. The traffic, in one example, can also be routed through EPC network to reach Internet 150.

SGSN (serving GPRS (general packet radio service) support node) 141 is configured to authenticate portable wireless user equipments, registering mobile devices, collecting network usage information for billing, et cetera. While SGSN 141 tracks and/or controls mobile communication, GGSN (gateway GPRS support node) 142 inspects and routes information and/or packet traffic between mobile terminal(s) and intended destination(s). MME (mobility management entity) 142, in one aspect, is used to facilitate data transfer between 3G and LTE or between 2G and LTE (or 4G). In LTE (or 4G) network environment, MME 142 performs various controlling/managing functions, such as UE (user equipment) idle mode for tracking, paging, and retransmitting activities. MME 142 also provides network security management as well as resource allocations. S-GW (service gateway) 143 and P-GW (PDN gateway) 144 are responsible for transporting packets between mobiles and destinations via one or more networks such as Internet and LAN.

During an exemplary operation, when user 106 sends a packet to user 108, the packet travels from cell site 102 to routers 130-134 via connections 170-174. After the packet enters Internet 150 via connection 180, it is subsequently received by user 108. To route and facilitate data traffic efficiently, NEs 130-140 in switching network 104 are required to be managed and monitored. To monitor network performance, CO 116, in one embodiment, deploys a network management system ("NMS") 152 or other performance monitoring system to monitor status of switching network 104 based on statistics generated by NEs.

NEs 130-140 and network nodes 141-145 are communication devices containing one or more processors such as CPU(s) and/or NP(s). Some of NEs 130-140 and/or nodes 141-145 may be formed as processing cards and/or line cards arranged or housed in a chassis having multiple slots for housing various cards. The software and/or microcode installed or preloaded on CPUs and NPs requires regular maintenance and upgrade in order to keep the communication devices to operate efficiently. To minimize service interruption during the software upgrade, NE 130, in one embodiment, is configured to include ISUM 166 which is used to coordinate software upgrade or downgrade using virtualization capabilities. It should be noted that any one of NEs 130-140 or nodes 141-145 could be provisioned to be ISUM 166 for coordinating software upgrade.

CO 116 includes NMS 152, computers or servers 156-158, and network administrator 162. NMS 152, in one example, manages network traffic by monitoring and managing every communication device. When new release of software 164 becomes available, NMS 152 determines which group of NEs or nodes will be upgraded first while other NEs or nodes will be upgraded last based on a predefined upgrade scheme for minimizing service interruption.

ISUM 166, in one embodiment, manages and/or facilitates ISSU conversion for a group of NEs such as routers situated. "In-service" upgrade or downgrade implies that a device continues to offer its network service while its software is moved from one version to another. Use of virtualization technology, for instance, allows one VM running the current version of software and a second VM running a new version of software. High-availability mechanisms such as checkpointing may be used to synchronize execution state or states between existing (old) VM and new VM. To achieve in-service upgrade/downgrade to a targeted version of code, program or system states (or status) stored or recorded in checkpoint, for example, are passed to the new VM when the execution control is transferred to new version of code.

ISUM 166 is also able to isolate two VMs with respect to inter-process communication ("IPC") to reduce version skews. ISUM 166 is able to facilitate in-service software conversion using ISSU for data-path devices such as LCs. For a multi-node network system, all nodes are coordinated, orchestrated, and switched over simultaneously or almost simultaneously from V1 software to V2 software to, for example, reduce version skews. Version skew, for example, may occur when two nodes running two different versions of software while trying to communicate with each other.

One advantage of employing ISUM is that it can upgrade or downgrade software of a networking device without substantially affecting network services delivered by the networking device.

Figure 2:
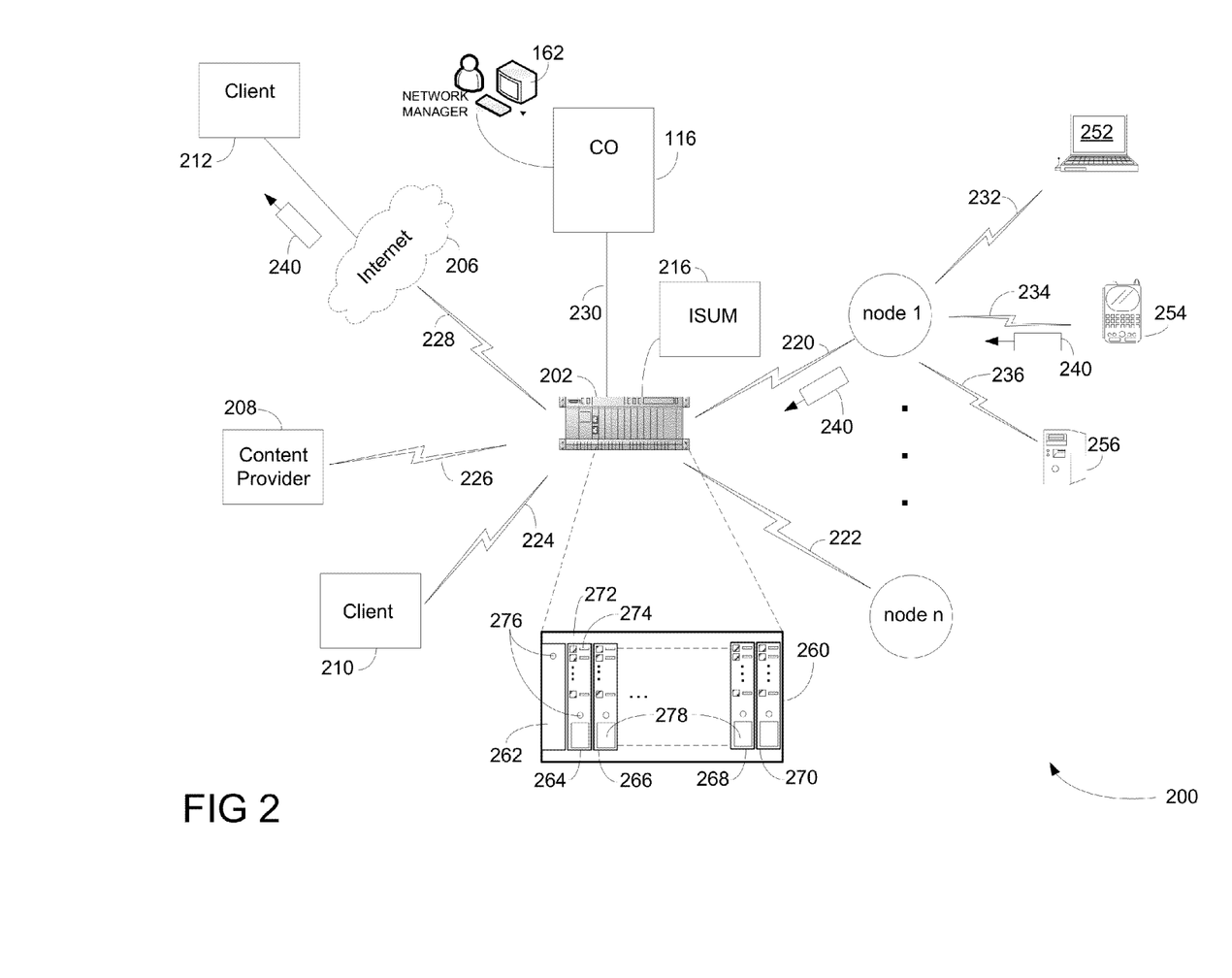
FIG. 2 is block diagram illustrating an exemplary network layout employing in-service software upgrade/degrade manager ("ISUM") capable of minimizing performance degradation during software conversion in accordance with one embodiment of the present invention.

FIG. 2 is block diagram 200 illustrating an exemplary network layout employing ISUM capable of minimizing performance degradation during software conversion in accordance with one embodiment of the present invention. Diagram 200 includes a network system ("NS") 202, CO 116, content provider 208, clients or end user 210-212, and various network nodes. Network nodes, also known as nodes, include node 1 through node n wherein n can be any integer number. In a communications network, a physical network node or node can be an NE or a cluster of network devices, such as a router, modem, hub, bridge, switch, handset, computer, server, workstation, et cetera. Node 1, for example, can be a network entity capable of coupling to host 252, portable device 254, and server 256 via connections 232-236. Alternatively, multiple nodes can be physically located or resided in one centralized location or chassis. It should be noted that the underlying concept of the exemplary embodiment(s) of the present invention would not change if one or more blocks (or devices) were added to or removed from diagram 200.

NS 202, which can be a router, switch, or node, is configured to direct or route packet flows between nodes and/or clients 210-212. A network manager or administrator 162 is able to communicate with NS 202 via CO 116 via connection 230. Alternatively, CO 116 can be configured to reside within NS 202. NS (or router) 202 can also be configured to provide routing services to remote clients such as client 212 via Internet 206. Connections 220-228, which can be wired, wireless, or a combination of wired and wireless cables or connections, are employed to connect NS 202 to clients 210-212, content provider 208, and nodes. Note that client(s) can be servers, routers, switches, computers, user's equipments, mobiles, network equipments, network elements, websites, and so forth.

NS 202, in one embodiment, includes a rack or chassis 260 containing a network processing card ("NPC") 262 and multiple LCs 264-270. NPC 262 including a power-on indicator 276 is configured to distribute incoming traffic to one of LCs 264-270 for packet processing and routing. Each of LCs 264-270, which contains multiple port connectors 272 and status indicators 274, is able to route packet flows to their destinations via one or multiple networks. Each of LCs 264-270, in one embodiment, includes at least one CPU and one NP wherein the CPU is configured to maintain system virtualization as well as system control. The NP is a specialized packet processing engine ("PE") responsible for processing and routing packet flows. In one embodiment, NS 202 including ISUM 216 is configured to implement ISSU using system virtualization while maintaining network service based on the existing software.

NS or router 202, in one aspect, performs a function of a network hub capable of routing packet flows between various NEs. A packet flow, for example, is a packet or a packet stream traveling through a network. At any given time, hundreds or thousands packets or packet streams travel through a network or a node simultaneously. A function of network hub is to monitor, inspect, and route packet streams between clients and nodes. For example, a portable handheld device 254 sends a flow 240 to client 212 via node 1. When router 202 detects flow 240 at its port connected to connection 220, router 202 processes flow 240 in accordance with information stored in one or more look-up tables. Upon identifying the destination addresses from the header of flow 240, flow 240 is subsequently sent by router 202 via its port connected to connection 228. Flow 240 will reach its destination via Internet 206.

ISUM 216, in one embodiment, is configured to manage and coordinate software upgrade of various processing units including, but not limited to, NPs, CPUs, PEs, et cetera. ISUM 216, for example, receives new release of microcode and coordinates software upgrade of every processor and/or NP in each LC and NPC over a predefined period of time without significantly hampering network services. Network services include routing packet flows traveling through NS 202. Alternatively, ISUM 216 is able to identify which processors or NPs need to be reloaded with version 2 of network software while other processors do not require upgrading because they are different versions of hardware.

An advantage of using ISUM is that it could reduce and/or avoid hardware redundancy for software upgrade of a device. The use of virtualization technology, in one aspect, provides virtual machines, CPUs, processes, and/or processors which indirectly create a form of redundancy. Another benefit of employing ISUM is IPC isolation which avoids IPC versioning as well as drawbacks associated with IPC versioning. It should be noted that definitions of checkpoint files or data structures are more amenable than IPC messages.

Figure 3:
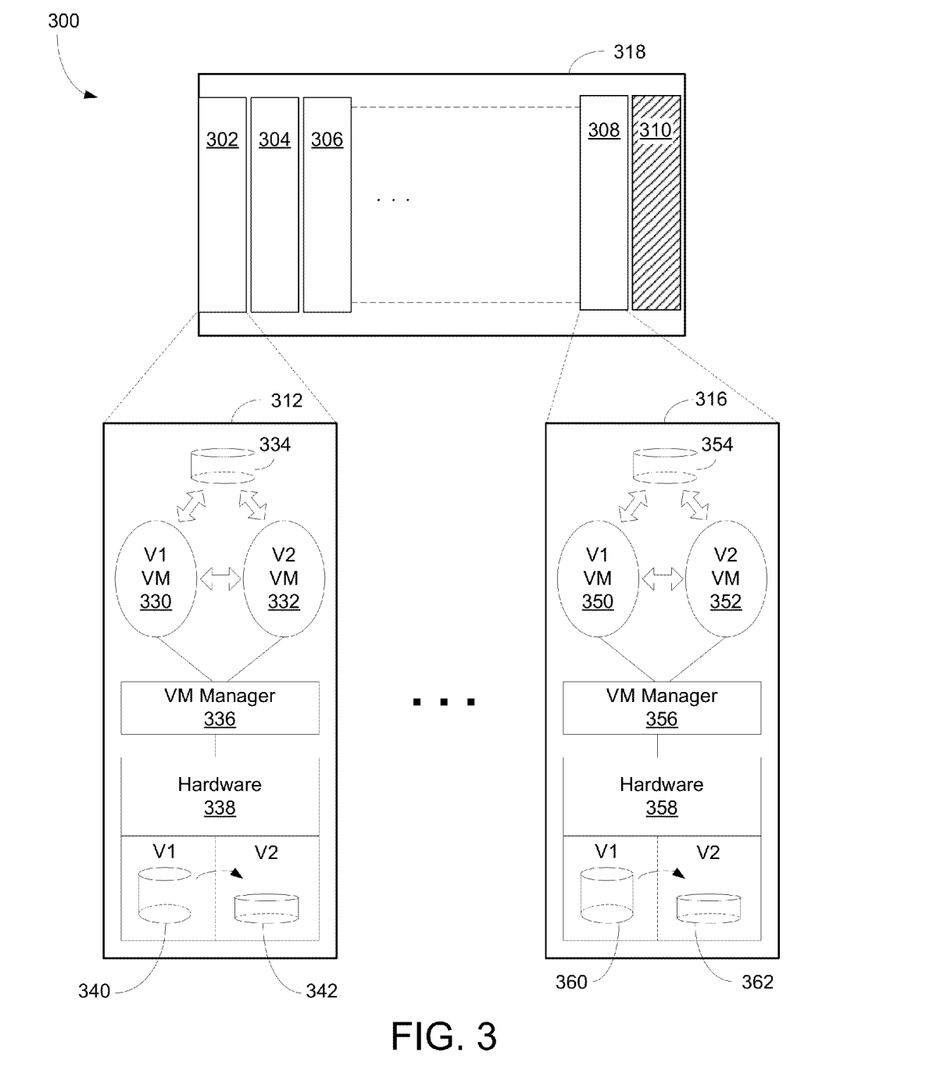
FIG. 3 is a block diagram illustrating a network system having multiple cards capable of implementing ISSU to enhance network performance in accordance with one embodiment of the present invention.

FIG. 3 is a block diagram 300 illustrating a network system having multiple cards capable of implementing ISSU for software conversion with minimal performance impact in accordance with one embodiment of the present invention. Diagram 300 illustrates a chassis or rack 318 containing multiple slots capable of housing or seating multiple cards. Chassis 318, for example, represents a node, receives multiple cards 302-308 and is further able to accept additional card(s) in its empty slots 310 as needed. Alternatively, chassis 318 may contain multiple nodes wherein each card or a group of cards represents a node. It should be noted that the underlying concept of the exemplary embodiment(s) of the present invention would not change if one or more cards (or modules) were added to or removed from diagram 300.

Cards 302-308, in one example, include one NPC and multiple LCs. The NPC or processor card, in one aspect, is responsible for managing and controlling chassis 318 as well as LCs. In another example, one of LCs is used in place of the NPC to perform functions of processor card. The LCs, in one example, are used for processing and routing packets or packet traffic. In one embodiment, chassis 318 is configured to perform ISSU using VMs for code upgrade (or new LC) without powering down or reboot chassis 318 or any LCs.

Each card includes a digital processing circuitry such as CPU or microprocessor wherein LC may further include one or more NP for network routings. In one embodiment, CPU of an NPC such as card 302 manages and/or controls chassis 318 including LCs 304-308. CPU executes loaded instructions or program based on an operating system to perform various functions. The operating system or microcode requires regular maintenance and/or upgraded, such as new functions, bug patches, and/or updated security settings. When newly released software or microcode becomes available, the ISUM performs ISSU for software conversion by downloading new software to one VM while running current software on existing VM for maintaining network services.

To simplify following discussion, card 302 is designated as an NPC containing processing logic 312 and cards 304-308 are designated as LCs containing processing logic 316. Processing logic 312 or 316 includes hardware, firmware, software, storage, et cetera, and is able to establish VMs to implement ISSU. Note that processing logic illustrates a logic flow of control associated with various components wherein the components can be hardware, software, firmware, and the like.

Processing logic of NPC 312 includes version one (1) virtual machine ("V1VM") 330, version two (2) virtual machine ("V2VM") 332, VM manager ("VMM") 336, hardware 338, checkpoint memory 334, and storages 340-342. Processing logic 312, in one embodiment, controls ISSU for every device in chassis 318 including when and how to upgrade software. For example, upon receipt of a signal of software upgrade sent by a network administrator, processing logic 312 actives ISSU manager(s) and ISSU proxies wherein ISSU manager coordinates software conversion in NPC. The proxies reside on all cards including control cards wherein the proxies perform card-specific ISSU management and take orders or instructions from ISSU manager. The ISSU manager runs on the control card but orchestrates the ISSU process on all cards via the proxies.

Hardware 338 is fundamental hardware platform having various components including, but not limited to, CPU, registers, buses, communication circuits, memory interfaces, and the like. The CPU of hardware 338 is able to provide system virtualizations to emulate multiple independent virtual processing systems using VMM 336. The system storage, in one aspect, is able to dynamically allocate hardware resource to V1 storage 340 and V2 storage 342 according to a predefined schedule. V1 storage 340 may be designated to V1VM 330 while V2 storage 342 is used by V2VM 332. In operation, CPU of hardware 338 may initially allocate 10 percent ("%") of memory (or resource) to V2 storage 342 when V2VM is just being established. The other 90% of memory (or resource) remain with V1 storage 340 for operation of network service provided by V1VM 330. When new code or V2 code is loaded to a process of V2VM 332, additional hardware resource such as memory is subsequently allocated to V2 storage 342 for preparing V2 code to take over the execution procedures.

System virtualization is a hardware virtualization technique permitting several operation systems running simultaneously on a single hardware platform such as a network device or computing module. VMM 336 allows each of the multiple operating systems operating independently on a virtual operation platform and manages the execution of the operating systems. Multiple virtual operating systems or instances are configured to share virtualized hardware resources such as memory or storage space. For example, Linux Kernel-based virtual machine may be used to implement the system virtualization.

VMM 336, which is also known as hypervisor, is logically situated at least one layer above hardware 338 which is used for providing system virtualization. System virtualization is also known as operating system-level virtualization which creates VMs in virtual environments. For example, VMM 336 is able to host two independent virtual processes or environments such as version 1 of network software running on V1VM 330 and version 2 of network software running on V2VM 332. The ISUM, in one aspect, controls timing regarding when processing logic of NPC 312 should migrate from V1VM 330 to V2VM 332. To synchronize execution sequence between V1VM 330 and V2VM 332, execution status and sequence states stored in checkpoint memory 334 are used. It should be noted that checkpoint memory 334 can be part of storages 340-342.

Checkpoint is a fault tolerance/recovery technique capable of storing various snapshots or states of one or more current applications. The snapshots are stored and later can be fetched for restoring execution sequence of an application. Checkpoint memory 334 or 354 contains checkpoint files or snapshots which are continuously replicated or updated from an active VM to a standby VM. Some applications can be restored at a new process of newly installed software running on a new VM in accordance with the checkpoint files. Some activities may be prioritized. For example, programming interfaces and routes into kernel and/or programming datapath may have higher priority. It should be noted that data written to checkpoint memory 334 persists even after the process restarts.

The ISUM facilitates the PCI to pass-through allowing the active VM to own the PCI devices. The PCI devices may be subsequently transferred from one VM to another upon switchover. To minimize or eliminate versioning of IPC or IPC messages, the ISUM ensures that V1 VMs on one node can communicate only with V1 VMs on another node. Likewise, V2 VMs on one node can talk only to V2 VMs on another node.

Processing logic of LC 316 includes V1VM 350, V2VM 352, VMM 356, hardware 358, checkpoint memory 354, and storages 360-362. Processing logic 316, in one embodiment, controls ISSU for LC including data-path element(s). For example, upon receipt of the signal of software upgrade from the ISSU proxy, processing logic 316 manages LC ISSU process for software conversion. Hardware 358 includes CPU, registers, buses, communication circuits, memory interfaces, et cetera, and is able to provide system virtualization to emulate multiple independent virtual processing systems using VMM 356. Once the CPU is upgraded or downgraded, the data-path elements such as NP(s) and lookup tables are subsequently upgraded or downgraded accordingly.

The system storage, in one aspect, is able to dynamically allocate resource to V1 storage 360 and V2 storage 362 according to a predefined schedule. V1 storage 360 may be accessed by V1VM 350 while V2 storage 362 is used by V2VM 352. VMM 356, which is similar to VMM 336, is situated at least one layer above hardware 358 used for providing system virtualization. For example, VMM 356 is able to host two independent environments such as version 1 of network software running on V1VM 350 and version 2 of network software running on V2VM 352. To synchronize execution sequence between V1VM 350 and V2VM 352, execution status and sequence states are obtained from checkpoint files stored in memory 354. It should be noted that checkpoint memory 354 can be part of storages 360-362.

An advantage of using ISUM with system virtualization is that it can reduce packet loss during non-stop packet forwarding while the software of router is upgraded or downgraded. Another advantage of the embodiment of present invention is that is can reduce loss of network topology. It should be noted that while CPU level of redundancy can be configured such as using VM, redundancy at NP level or data-path element may be different or more difficult partially because of continuous packet flow.

Figure 4:
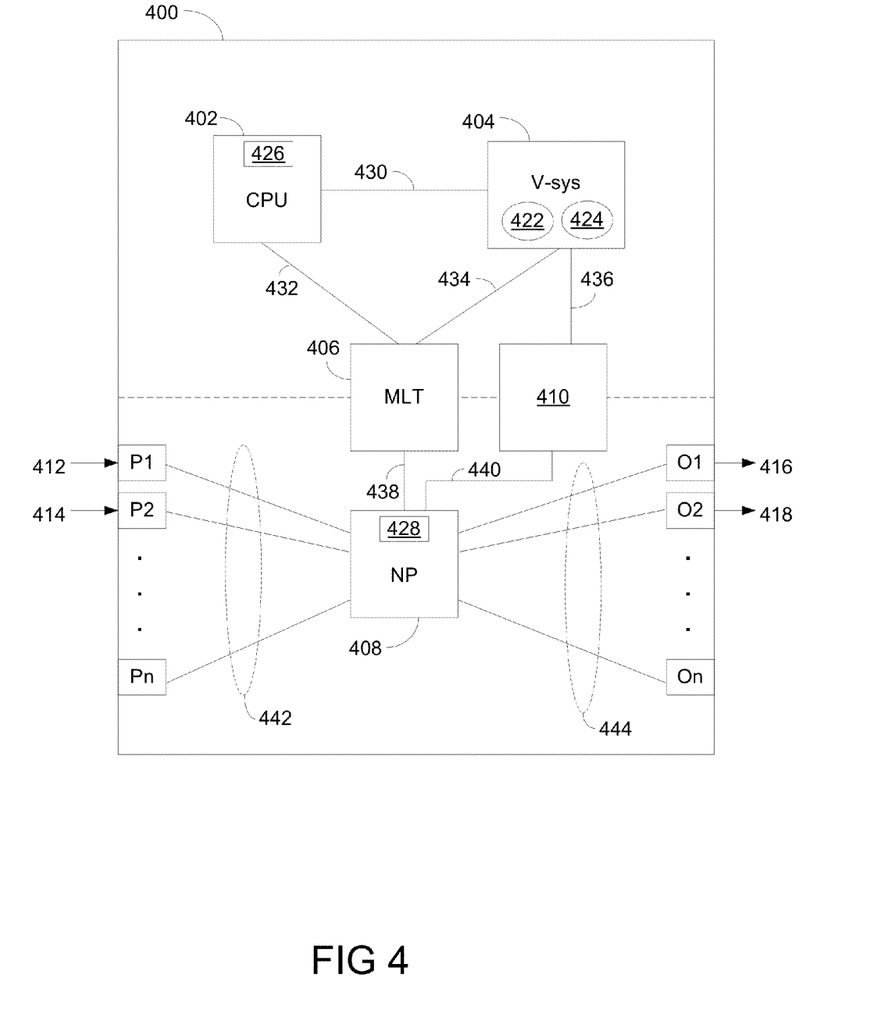
FIG. 4 is a block diagram illustrating a line card able to implement ISSU at NP level using system virtualization in accordance with one embodiment of the present invention.

FIG. 4 is a block diagram 400 illustrating a LC able to implement ISSU at NP level using system virtualization in accordance with one embodiment of the present invention. Diagram 400 includes a CPU 402, a multiple look-up table ("MLT") 406, a system manager 410, and an NP 408, wherein CPU 402 is configured to manage system virtualization 404. Connections 430-440 are employed to connect CPU 402, MLT 406, system manage 410, system virtualization 404, and NP 408. It should be noted that the underlying concept of the exemplary embodiment(s) of the present invention would not change if one or more blocks (or devices) were added to or removed from diagram 400.

MLT 406 is a look up table ("LUT") having a lookup key region, a first lookup result region, and a second lookup result region. The LUT is structured in such a way that each lookup key is associated with two lookup results wherein the first lookup result is associated with one release of microcode and second lookup result is associated with another or new release of microcode. In one embodiment, MLT 406 allows the first result region of the LUT to be continuously referenced or searched by an NP for packet routing while the second result region is programmed with second results generated in accordance with version 2 of network software. In one example, MLT 406 is maintained by CPU 402.

CPU 402 manages and handles ISSU proxy. When newly released software or microcode is available, the newly released software or microcode is subsequently installed in CPU 402. In one aspect, CPU 402 includes a code migration module 426 configured to allow CPU 402 to migrate from an old release of microcode to a newly released microcode while allowing the NP to continue routing incoming packets in response to the result from the first lookup result region in the LUT. CPU 402, in one aspect, instructs the NP to migrate from a version 1 of network software to a newly released microcode when the content of second results is generated or built in accordance with the lookup keys as well as in compliance with the version 2 of network software. Upon completion of generating the second results in view of existing stored look keys, the second results are stored in the second result region of the LUT.

NP 408 is able to process and route incoming traffic in response to at least one of the two lookup results in MLT 406. In one embodiment, an LC further includes a transmitting NP 428 which is responsible for sending or forwarding processed packet streams or flows to output outs as such $O_1$ to $O_n$ via connections 444. For example, transmitting NP 428 is configured to forward a packet stream in accordance with a result from the first lookup result region of the LUT. NP 408 may include multiple processing components, such as receiving processing component, transmitting processing component, looking up component, and the like. In one aspect, NP 408 is able to process and route a packet stream between input ports P1 to Pn and output ports $O_1$ to $O_n$ via connections 442-444 in accordance with the content obtained from the first lookup result region of the LUT.

Figure 5:
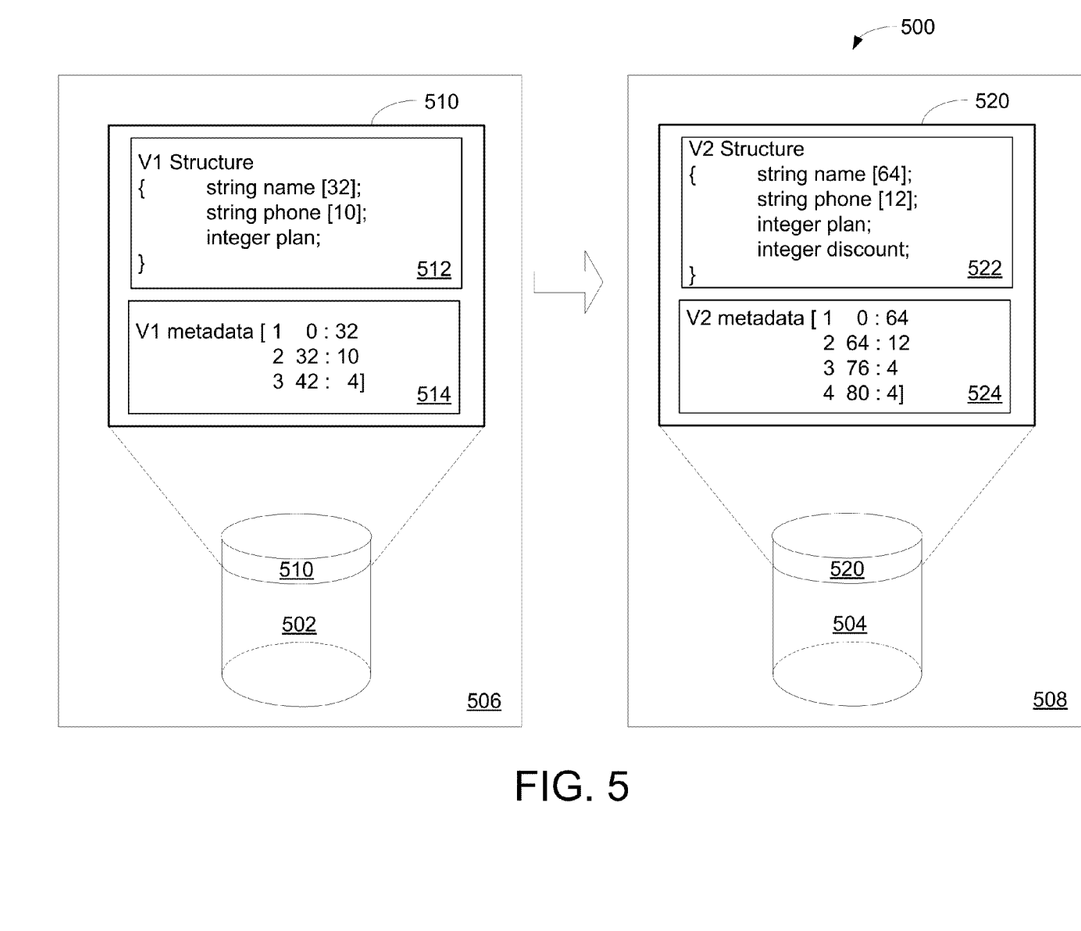
FIG. 5 is a block diagram illustrating a process of performing ISSU to program or application internal state using type, length and offset ("TLO") metadata in accordance with one embodiment of the present invention.

FIG. 5 is a block diagram 500 illustrating a process of performing ISSU for software conversion to a program or application internal state using type, length and offset ("TLO") metadata in accordance with one embodiment of the present invention. Diagram 500 illustrates a current image 506 and a target image 508. Current image 506 includes a database or file 502 having a metadata 510. Target image 508 includes a database or file 504 having a metadata 520. Depending on the applications, databases or files 502-504 are the same or substantially same databases or files. It should be noted that the underlying concept of the exemplary embodiment(s) of the present invention would not change if one or more blocks (or devices) were added to or removed from diagram 400.

In-service upgrade or downgrade implies that a device continues to offer its regular or assigned service while its software is upgraded moving from one version to a new version. The ISSU requires internal state(s) of various programs in the currently running image to be appropriately converted into a form that can be understood by the various programs in the target image. The ISUM using type, length, offset ("TLO") approach facilitates a seamless conversion of the internal state from one version to another without impacting the runtime performance of the application(s). Note that TLO approach is also applicable to "hot-fixes" or error patches in which code fix is applied to a running system to correct a defect or bug.

In a network environment, performance requirements for each device demand that the programs maintain their internal state in binary form for efficient access and manipulation. Translation or conversion of binary forms across different versions, however, can be difficult partially because the binary forms are closely tied to compiler alignment, word size and so on. The TLO approach, in one embodiment, allows various programs to continue to work with binary data and provides a faster conversion of internal state from a binary format of one version to a binary format of another version.

Metadata 510, in one example, includes a structure 512 illustrating version 1 ("V1") data structure and V1 metadata 514 showing TLO metadata format. Note that structure 512 shows a structure in higher level program language while metadata 514 shows a structure in binary format. Structure 512 and metadata 514 could be the same logic expression depending on the applications.

Structure 512, for example, includes string name having 32 bits, string phone number having 10 bits, and integer plan having 4 bits. V1 metadata 514 includes identifier ("ID") 1 referring to name having 32 bits counting from binary bit position 0 to 31, ID 2 referring to phone number having 10 bits counting from binary bit position 32 to 41, and ID 3 referring to plan having 4 bits counting from binary bit position 42 to 45. In one embodiment, the first column of ID in V1 metadata refers to type, the second column indicating number of bits refers to length, and the third column refers to offset. Note that TLO metadata is more flexible and provides backward compatibility between versions of software.

Metadata 520, in one embodiment, includes a structure 522 illustrating V2 data structure and V2 metadata 524 illustrating TLO metadata structure. Note that structure 522 shows a structure in higher level program language while metadata 524 shows a structure in binary format. Structure 522 and metadata 524 could be the same logic expression or definition. In one example, structure 522 includes string name having 64 bits, string phone number having 12 bits, integer plan, and new variable discount having 4 bits as integer. V2 metadata 524 includes ID 1 having 64 bits counting from binary bit position 0 to 63, ID 2 having 12 bits counting from binary bit position 64 to 75, ID 3 having 4 bits counting from binary bit position 76 to 79, and ID 4 which is new variable having 4 bits counting from binary bit position 80 to 83.

For a process of ISSU using system virtualization, the ISUM establishes or builds TLO metadata 520 in target image 508 while maintains current image 506 for continuously providing network service. TLO metadata, in one example, is attached to database and informs CPU how to process data stored in the database such as database 502 or 504. In one embodiment, database such as database 502 does not require substantial version conversion from V1 to V2 as long as metadata is properly converted. Depending on the applications, TLO approach can be used when marshaling and unmarshaling the data into a form suitable for messaging or for storing it on a persistent medium.

Applications, in one aspect, define their data structures using a C-like pseudo language as a set of definition files. A data structure includes various fields wherein each field specifies a certain data-type. Each field, in one embodiment, is assigned a unique ID value or TYPE. When a field's data-type changes, a new ID is assigned. Depending on the applications, reusing of ID values is prohibited. A compiler compiles the definition files to produce C header files that contain the data structures that applications can use in their programs. The compiler also produces metadata using TLO as fields in the data structure. The TLO metadata, in one embodiment, is persisted along with the actual data of the applications in checkpoint files abstracted on top of shared memory. The metadata is also built into the image that is loaded on a device. In an upgrade/downgrade scenario, the new image compares the metadata built into its own image with the metadata persisted in the checkpoint files produced by the previous version to decide what kind of conversions should take place. The TLO metadata is able to accommodate custom conversion functions for non-trivial conversions.

The TLO approach is used to ensure compatibility across differing implementations and versions. Newly established or built TLO metadata is used to facilitate seamless conversion from V1 to V2. An advantage of using TLO metadata is that applications continue to work with C data structures for the best performance while allowing upgrades/downgrades of new version.

Another advantage of using TLO metadata with ISUM is that it could reduce performance impact. The ISUM with TLO approach allows programs to continue working with binary structures and at the same time, binary format of one version is converted to the binary format of another version. The conversion procedures take care of additions, deletions, and modifications to the individual fields that make up a data structure.

The exemplary aspect of the present invention includes various processing steps, which will be described below. The steps of the aspect may be embodied in machine, router, or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 6:
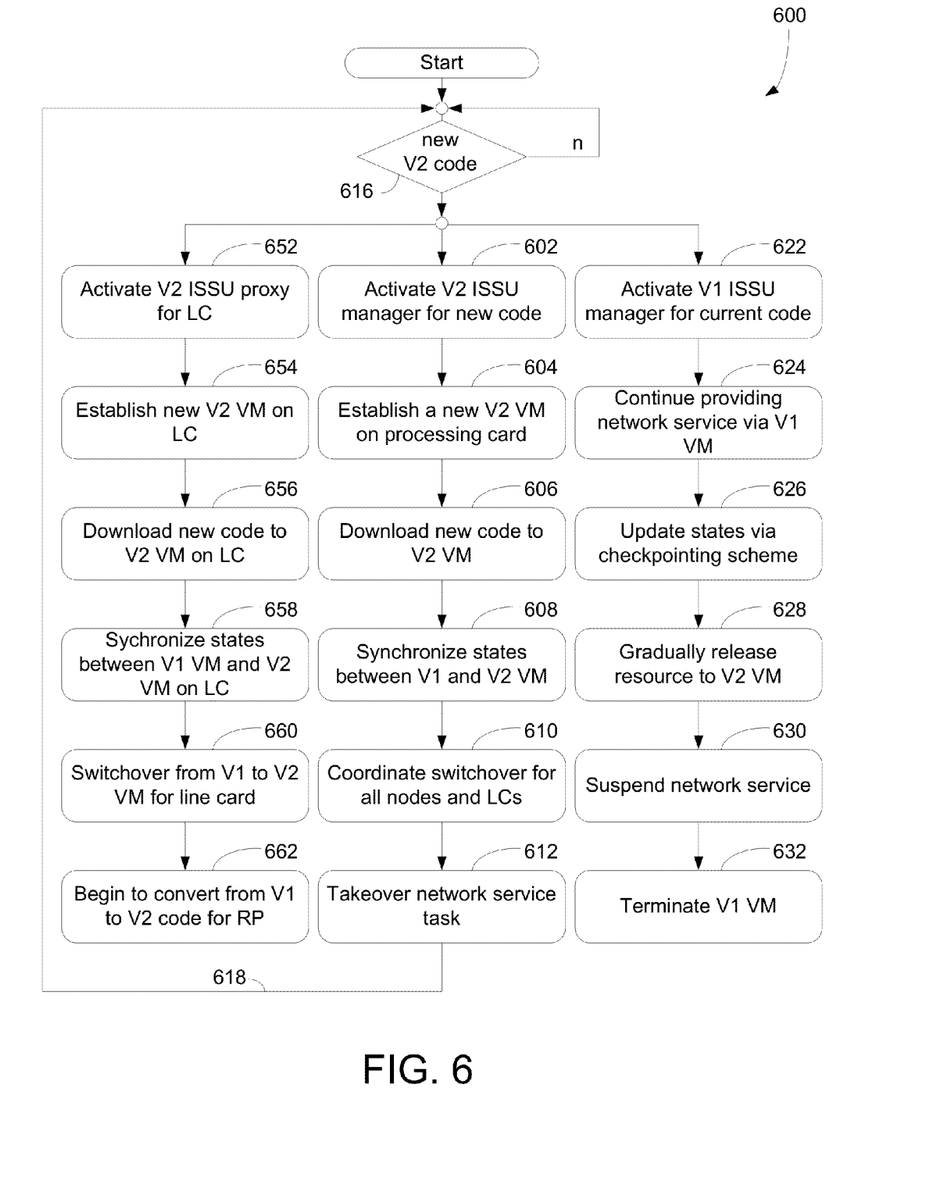
FIG. 6 is a flow diagram illustrating an exemplary process of ISSU for a network system using system virtualization in accordance with one embodiment of the present invention.

FIG. 6 is a flow diagram 600 illustrating an exemplary process of ISSU for a network system using system virtualization in accordance with one embodiment of the present invention. The process managed by ISUM periodically examines whether new code or new version of software such as V2 of microcode is available for download at block 616. It should be noted that a program modification signal or a signal of new version software can be broadcasted by a network administrator or a network management system. If the new version of code is not available, the process loops back waiting for the next time period. If the new version of code or V2 microcode is available, the process, in one embodiment, proceeds to blocks 602, 622, and 652.

After activating V2 or new version of ISSU manager or ISUM for software upgrade at block 602, the process, at block 604 establishes a new V2 VM on a processing card via virtualization capabilities. The ISUM, in one embodiment, forwards signals for establishing ISSU proxies at LCs as well as creating V1 ISSU for maintaining network services. Upon downloading new code to the V2 VM at block 606, the states between V1 VM and V2 VM are synchronized in accordance with information stored in checkpoint files at block 608. After coordinated switchover initiated by ISUM for all nodes and LCs at block 610, the process, at block 612, instructs V2 VM to take over the task or responsibility of network service. The process subsequently loops back to block 616 checking for the new software updates.

At block 622, after V1 ISSU manager is activated for managing current code or existing version of software, the process, at block 624, continues to provide network services via V1 VM. Note that the network service includes processing and routing packets, monitoring network traffic, metering network usage, and the like. While continuously or periodically updating the states or snapshots of applications and/or data storage at block 626, the resource is gradually released by V1 VM and transferring the released resource to V2 VM at block 628. For instance, memory space is gradually decreased at V1 VM and is added to V2 VM for preparing V2 VM to take over the execution task. When the switchover is issued, the process suspends network service based on V1 VM at block 630. When V2 VM takes over the network service, V1 VM, at block 632, is terminated or killed.

At block 652, after activating V2 ISSU proxy for an LC in response to instructions from V2 ISUM, the process, at block 654 establishes a new V2 VM on the LC via its virtualization capabilities. Upon downloading new code to the V2 VM at block 656, the states between V1 VM and V2 VM are synchronized in accordance with information stored in checkpoint files at block 658. After coordinated switchover initiated by ISSU proxy at block 660, the process, at block 662, instructs V2 VM of LC to take over the task or responsibility of network service.

In one exemplary operation, while current or V1 image is running in one VM on a card, another VM is launched to create a target or V2 image. V2 process(es) is spawned and idled after completion of initialization. After V1 processes and data-path are prepared for switchover, V2 VM is given control for network service, and V1 VM is subsequently terminated. Note that data-path may still be running V1 microcode using V1 look-up tables even though CPU is already upgraded with V2 code running on V2 VM.

Figure 7:
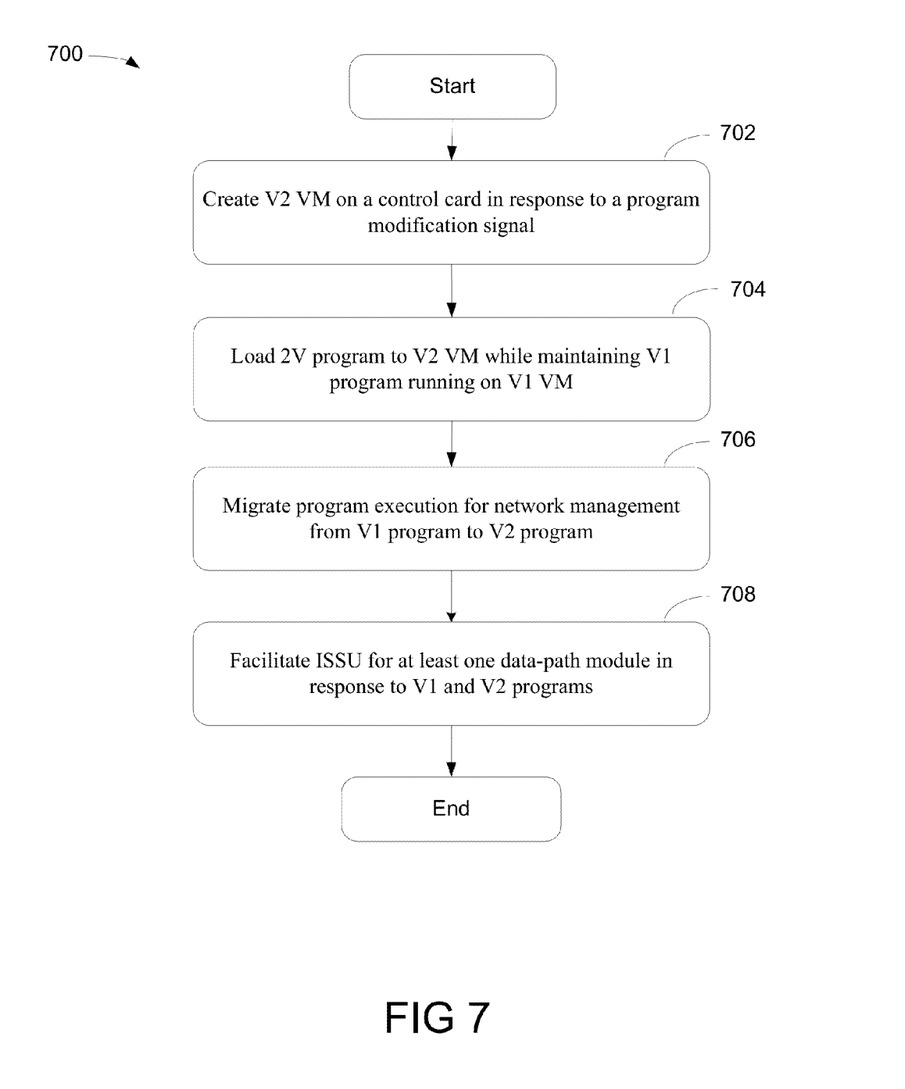
FIG. 7 is a flowchart illustrating an exemplary ISSU using virtualization technology to minimize performance degradation in accordance with one embodiment of the present invention.

FIG. 7 is a flowchart 700 illustrating an exemplary ISSU for software conversion using virtualization technology in accordance with one embodiment of the present invention. At block 702, a process capable of performing ISUM creates a V2 VM on a control card in response to a program modification signal. Note that V1 VM and V2 VM operate on a single hardware platform, such as NPC, LC, or a network hardware device. For example, the process is able to establish a new operating system operating as a new virtual entity running concurrently with the first VM on a processing card. In one aspect, ISSU proxies for multiple LCs are activated for synchronizing version transition between version 1 network software and version 2 network software.

At block 704, a second version of program or new version of software is loaded on V2 VM while V1 program running on V1 VM is maintained for providing network management. During the period of installing newly released software to V2 VM, the existing software continuously supports network management such as processing and routing packets.

At block 706, the program execution for network management migrates from V1 program to V2 program. The process is capable of gradually transitioning resource from V1 VM to V2 VM in accordance with a predefined resource allocation schedule.

At block 708, V2 program running on V2 VM is activated to take over task(s) of network management from V1 program. The process orchestrates switchover from V1 program to V2 program approximately the same time for all nodes to minimize version skews. In one embodiment, the process facilitates ISSU for one or more data-path module in response to V1 and V2 programs.

Figure 8:
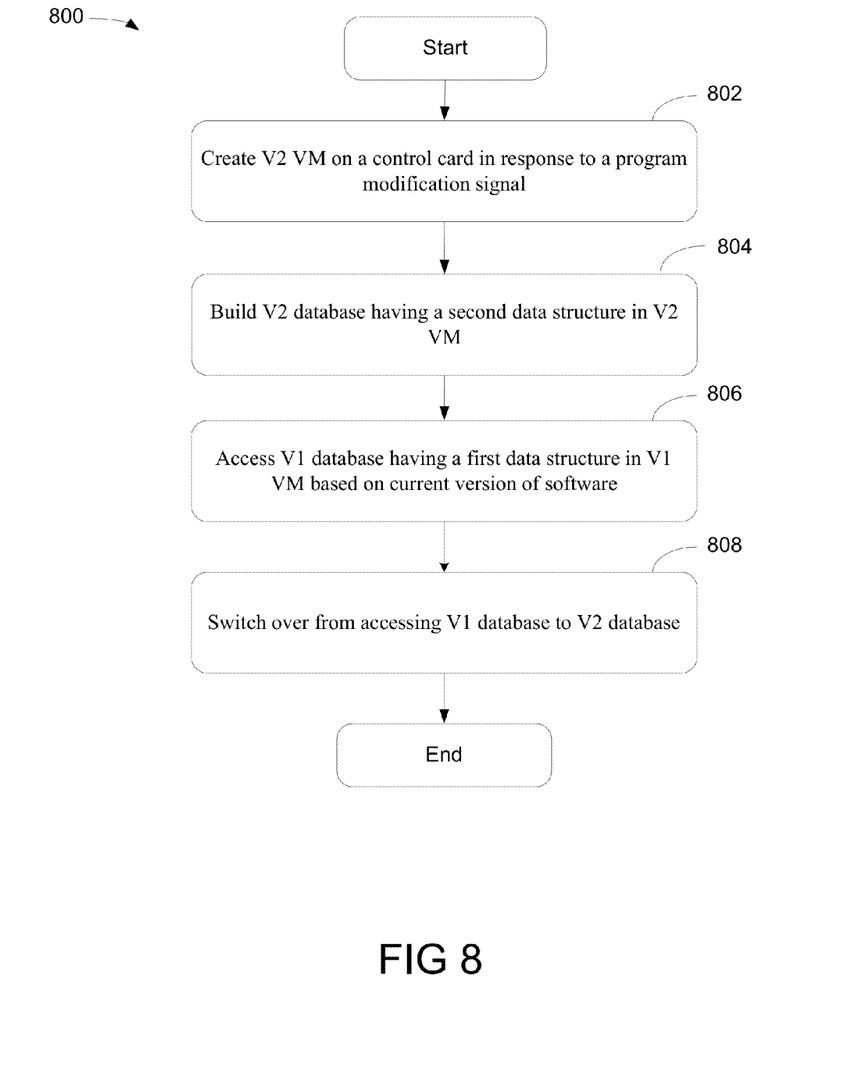
FIG. 8 is a flowchart illustrating an exemplary ISSU using virtualization technology to convert internal state of a program using TLO metadata in accordance with one embodiment of the present invention.

FIG. 8 is a flowchart 800 illustrating an exemplary ISSU using virtualization technology to convert internal state of program using TLO metadata in accordance with one embodiment of the present invention. At block 802, a process capable of performing an ISSU conversion, in one embodiment, is able to create V2 VM running on a network device in response to a program modification signal. ISUM and VMM are activated to manage V2 VM to run concurrently with V1 VM on a network computing device such LC or NPC.

At block 804, a V2 database having a V2 data structure is generated in V2 VM in accordance with the requirements relating to a new version of software such as V2 software. In one example, a data structure containing a value field, a length field, and an offset field such as TLO fields is established. The TLO metadata is created and attached to the converted database according to V2 or new version of microcode.

At block 806, V1 database having V1 data structure running on V1 VM based on current version of software is accessed or referenced. The process, in one example, continues to provide network services based on the current version of software via V1 VM while V2 software is installed on V2 VM.

At block 808, the process switches over from accessing V1 database hosted by V1 VM to V2 database hosted by V2 VM when a switchover command is received from ISSU manager. The V1 database having V1 data structure is subsequently deactivated, and V1VM is terminated.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for modifying software in a network system, comprising:
    creating a second virtual machine ("VM") on a control card in response to a program modification signal;
    loading a second version of program to the second VM while maintaining a first version of program running on a first VM for providing network management;
    migrating program execution for network management from the first version of program operated on the first VM to the second version of program operated on the second VM; and
    facilitating in-service software upgrade ("I SSU") for at least one data-path module in response to the first version and second version of programs,
    wherein creating the second VM on the control card includes establishing a new operating system operating as a new virtual entity running concurrently with the first VM on a processing card,
    wherein loading the second version of program to the second VM while maintaining a first version of program running on a first VM for providing network management includes installing a new release of software to a virtual process running on the second VM while allowing existing software running on the first VM to continue providing network management, and
    wherein migrating program execution for network management includes gradually transitioning hardware resource from the first VM to the second VM in accordance with a predefined resource allocation schedule.

2. The method of claim 1, further comprising facilitating the first VM and the second VM operating on a single hardware platform.

3. The method of claim 1, further comprising receiving the program modification signal from a network administrator.

4. The method of claim 1, further comprising activating the second version of program running on the second VM to take over task of network management from the first version of program.

5. The method of claim 1, further comprising activating a plurality of ISSU proxies for a plurality of line cards for synchronizing version transition between version 2 network software and version 1 network software.

6. The method of claim 1, further comprising orchestrating switch from the first version of program to the second version of program approximately same time for all nodes to reduce occurrence of version skew.

* * * * *